March 2, 1971     C. D. FIORE     3,566,610
METHOD AND APPARATUS FOR SEPARATING FLUIDS
Filed Sept. 23, 1968
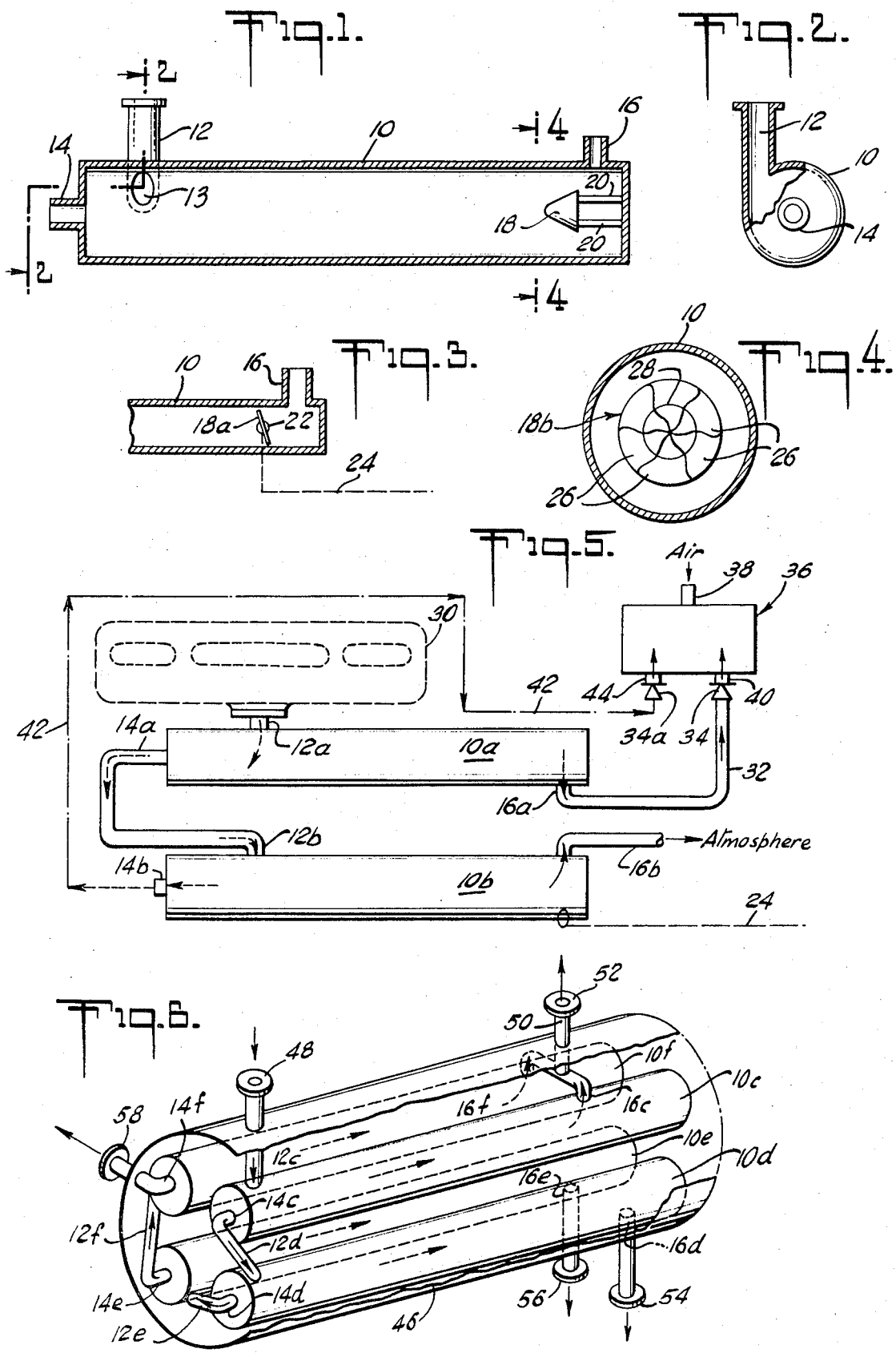

United States Patent Office 3,566,610
Patented Mar. 2, 1971

3,566,610
METHOD AND APPARATUS FOR
SEPARATING FLUIDS
Cosmo Dominic Fiore, 59—25 155th St.,
Flushing, N.Y. 11355
Filed Sept. 23, 1968, Ser. No. 761,588
Int. Cl. F25b 9/02
U.S. Cl. 62—5
26 Claims

ABSTRACT OF THE DISCLOSURE

A method and apparatus for separating a fluid into at least a more dense and less dense effluent stream which is effected by introducing the fluid tangentially into a near end of a cylindrical chamber through an inlet therein. The less dense portion is removed through a necked down, axially aligned, first exhaust port in the near end of the cylindrical chamber and the more dense portion is removed at the far end through a second exhaust port in the periphery thereof. The radii of a circular body in the cylindrical chamber upstream and adjacent the second exhaust port and of the cylindrical chamber adjacent the inlet, determine the density value about which the separation takes place for a specific flow rate.

BACKGROUND OF THE INVENTION

This invention pertains to a method and device for separating a fluid into at least a more dense effluent and a less dense effluent and in particular for applying the same to reducing air pollution from internal combustion engine exhaust and discharges of similar nature from hydrocarbon fueled engines. The invention is particularly directed to an improved method and device for separating at least a substantial amount of the noxious hydrocarbons and other contaminants from an automobile exhaust.

In the past, various methods and devices have been developed to treat internal combustion engine exhaust to remove the dangerous or undesirable components of combustion before they enter the atmosphere.

The exhaust from an internal combustion engine has been treated mechanically to remove the solid particles therein, for example, by rotating the exhaust so that the solid particles enter an elimination conduit or by passing the exhaust through filter means which retain particulate matter. The rotation of the exhaust required some sort of a centrifuging device to produce the centrifugal forces necessary to effect separation of the particlate matter from the exhaust. These are usually cumbersome and uneconomical to produce. The filter means do not sufficiently separate the exhaust components or if they do, obstruct the flow of the exhaust and cause a back pressure on the exhaust ports of an associated engine which results in a reduction of the power and efficiency thereof.

Chemical means have also been used to treat the exhaust either in combination with the mechanical means or separately. The chemical means usually employ a catalyst agent to obtain a more complete combustion. However, the chemical means have a limited useful life because their pores are filled up in time from the exhaust gases and must be replaced.

SUMMARY OF THE INVENTION

It is thus a principal object of this invention to provide an improved method and apparatus for the abatement of atmospheric pollution resulting from the operation of internal combustion engines.

Another object is to provide an improved method and apparatus for effectively removing the particular fluid components from internal combustion engine exhaust which cause atmospheric polution, simply and reliably.

A further object of this invention is to provide a method and apparatus for separating any number of different densities of fluid from a fluid stream.

A specific object of this invention is to provide a method and apparatus for effectively removing those portions of an internal combustion engine exhaust which are responsible for atmospheric pollution, by a method which is highly efficient and effective in operation.

A final object of the present invention is to provide a method and apparatus which will separate the components of the exhaust of an internal combustion engine and return to the engine intake manifold only those components of the exhaust desired.

The above, as well as additional and more specific objects will be clarified in the following description, wherein characters of reference refer to like numbered parts in the accompanying drawings. It is to be noted that the drawings are intended solely for the purpose of illustration, and that it is not intended or desired to limit the invention unnecessarily to any or all specific details shown except insofar as they may be deemed essential to the invention.

Briefly stated, the present invention relates to a method of separating a flowing body of fluid which includes components of at least two different densities into at least two separate effluent streams wherein the substantially heavier density fluid forms one separate effluent stream and the substantially lighter density fluid forms the other separate effluent stream.

The flowing body of fluid is directed into the near end of a substantially cylindrical chamber so that there is a direction component of flow present which is tangent to the wall thereof to develop the flowing body of fluid into a vortex within the cylindrical chamber. The fluid is separated in the cylindrical chamber according to density, into a stream of more dense fluid and a stream of less dense fluid. The effluent stream of less dense fluid is removed through a necked down passage concentrically located in the base at the near end of the cylindrical chamber. The effluent stream comprising the heavier density fluid portion is directed to an exhaust port in the periphery of the cylindrical chamber opposite the necked down passage and removed therethrough.

In accordance with the present invention, an apparatus for carrying out the inventive method includes a chamber for separating an incoming stream of fluid having at least two different density components, into at least a lighter density and a heavier density effluent. The chamber is substantially cylindrical and enclosed at its far end and necked down at its near end to form an axially aligned lighter exhaust passage for the lighter density effluent. The cylindrical housing has an intake port intersecting the periphery adjacent the near end and a heavier exhaust passage for the heavier density effluent intersecting the periphery adjacent the far end. An entrance conduit communicates with the intake port and the axis thereof has a direction component which is tangent to the periphery at the intake port. A circular body having a radius which is smaller than the cylindrical chamber radius is affixed coaxially therewith upstream and adjacent the heavier exhaust passage.

BRIEF DESCRIPTION OF THE DRAWINGS

This invention will be more readily understood by reference to the accompanying drawings which form a part of this application, wherein FIG. 1 is a longitudinal sectional view of an embodiment of the present invention;

FIG. 2 is an end view of the embodiment of FIG. 1 shown partly in section;

FIG. 3 is a partial longitudinal sectional view of an alternate embodiment of the present invention;

FIG. 4 is a sectional view of an alternate embodiment of the present invention taken along the lines 4—4 of FIG. 1;

FIG. 5 is a schematic diagram of an alternate embodiment of the present invention; and FIG. 6 is a schematic diagram of a further alternate embodiment of the present invention.

DESCRIPTION OF THE PREFERRED EMBODIMENTS

The present invention was developed while I was a graduate student at the Cooper Union located at Cooper Square, in the City and State of New York, working on my thesis for my master's degree in Mechanical Engineering. The thesis was published on June 5, 1968, and in it is the theory and calculations which prove the present invention and it is referred to as forming part of this disclosure.

The present invention makes use of the Ranque-Hilsch vortex tube which initially achieved fame as an energy separator. The vortex tube is modified for the present invention as shown in the drawings. Referring to FIGS. 1 and 2, it comprises a cylindrical housing or chamber 10 that is provided with an inlet conduit 12 axially disposed with a direction component which is tangent to the periphery of the cylindrical housing at an intake port 13. This allows a preselected stream of fluid entering the intake port 13 from the inlet conduit 12 to be injected so that it assumes a vortex flow within the cylindrical chamber 10.

It is to be understood by the term "direction component" that an arrow drawn along the conduit axis or in the direction of the flow velocity can be considered to be a hypothenuse of a right triangle whose legs are the two "direction components" which are at right angles to each other similar to a vector but without magnitude. Thus the conduit axis has a first component of direction tangent to the periphery of the cylindrical housing and a second component of direction radially oriented with the periphery of the cylindrical housing.

In a preferred embodiment of the present invention, the inlet conduit 12 has only a component of direction tangent to the periphery of the cylindrical chamber 10 so that the maximum energy of the preselected stream of fluid flowing into the cylindrical chamber 10 is available to develop the vortex. The cylindrical chamber 10 has a necked down, axially aligned, lighter exhaust passage or port 14 in the near end of the cylindrical chamber adjacent the intake port 13 and a heavier exhaust passage or port 16 in the periphery of the cylindrical chamber at the far end thereof.

A substantially circular body 18 such as a cone or disk is affixed, for example, on studs 20 attached to the far end of the cylindrical chamber, slightly upstream of the exhaust port 16.

The preselected stream of fluid separates by density into annular streams of similar density inside the cylindrical chamber 10. The surface area of the circular body 18, perpendicular to the axis of the cylindrical chamber 10, separates the density levels of the fluid in the cylindrical chamber by directing flow of the heavier density fluid toward the heavier exhaust passage. The lighter density fluid then exits out of the lighter exhaust passage 14.

The temperature of the effluent leaving the lighter exhaust passage 14 is cooler than the enternig stream of fluid while the temperature of the effluent leaving the heavier exhaust passage 16 is warmer than the entering stream of fluid. This temperature differentail is a characteristic of the Ranque-Hilsch vortex tube and reference is made to my thesis for further information thereon.

By employing the density gradient phenomena set up within the cylindrical chamber any incoming fluid can be divided into two separate effluent streams, the one stream containing the lighter density fluid and the other stream containing the heavier density fluid. For design purposes, when the lightest and heaviest density components in the heavier density effluent are selected, the radius of the circular body 18 can be determined from the following equation:

$$\rho r = \rho r_w \left[ 1 + \frac{\omega^2 r_w^2}{2C_p g T_w} \left( \frac{r^2}{r_w^2} - 1 \right) \right]^{1/\alpha - 1}$$

where:

$\rho r$ = the fluid density of the preselected lightest component in the heavier density effluent, $\rho r_w$ = the fluid density of the heaviest density component in the heaviest density effluent, $\omega$ = the angular velocity of fluid in a forced vortex in the far end of the cylindrical chamber 10, $r_w$ = the inside radius of the cylindrical chamber 10, $C_p$ = the specific heat at constant pressure of the preselected stream of fluid, $g$ = the acceleration due to gravity, $T_w$ = the temperature of the fluid adjacent the inside wall of the cylindrical chamber 10 near the heavier exhaust passage 16, $r$ = the radius of the circular body 18, and $\alpha$ = the ratio of the specific heat at constant pressure to the specific heat at constant volume of the preselected stream of fluid.

The configuration of the circular body 18 in FIG. 1 is a cone with a fixed radius. This configuration is most economical and adaptable to systems where there is a fixed flow velocity (i.e., $\omega$ is constant) of the preselected fluid through the intake port 13 or when the incoming fluid velocity varies, where the density value about which the components in the preselected fluid separate is not critical, and a slight inclusion af a heavier or lighter density component in the wrong effluent stream can be tolerated. Where the preselected fluid velocity varies, the inclusion of a heavier or lighter density component in the wrong effluent can be made negligible by increasing the velocity of the fluid passing through the intake port 13. This can be accomplished quite simply, as is well-known in the art, by decreasing the area of the intake port 13. At high flow velocity of the incoming preselected fluid passing through the intake port 13 there is little variation in the density value about which the components in the preselected fluid separate.

An alternate embodiment, shown in FIG. 3, includes a butterfly valve 18a rotatably mounted on a support rod 22 which is fixedly attached to the inside of the cylindrical chamber 10. A butterfly valve is a known means of varying a substantially annular opening in a cylindrical chamber with a disk which when fully closed presents its full surface area to block the cylindrical chamber opening. The disk is rotatably mounted along its diameter, to a support rod fixedly attached to the cylindrical chamber wall and perpendicular to the axis thereof. The butterfly valve 18a is varied about its support rod 22, as the flow velocity of the preselected fluid passing through the intake port is varied so that the variation in the density valve about which the components in the preselected fluid separate is constant.

For example, in a preferred embodiment of the present invention for separating the high density fluid components from the low density fluid components of the exhaust of an internal combustion engine, the butterfly valve 18a which is located upstream and directly in front of the heavier exhaust passage 16, is actuated by control linkage 24 connected to the throttle linkage of the engine (throttle linkage and engine not shown). The butterfly valve 18a is partially closed for idle and fully closed for high engine speeds. The butterfly valve 18a presents a surface area perpendicular to the axis of cylindrical chamber 10, which is substantially circular and in conjunction with the inside of the cylindrical chamber 10, offers a substantially variable annular opening. This substantially fixes the density value about which the components in the incoming fluid separate, in accordance with the equation defined above.

An alternate embodiment is shown in FIG. 4 where the circular body is an iris 18b, similarly positioned and attached inside the cylindrical chamber 10 in a known manner. An iris 18b as is well known, is a composite, circular, solid disk having leaves 26 which are held by a central rotatable ring 28 which when rotated, moves the leaves to vary the size of the disk. The iris 18b provides a variable annular gap between the periphery thereof and the inside surface of the cylindrical chamber 10. The size of the iris 18b is varied through linkage 24 in a known manner, by the throttle linkage (not shown) of the internal combustion engine (not shown) or linkage (not shown) from a flow meter located in the incoming stream of fluid adjacent the intake port 13. The throttle linkage is adjusted to increase the radius of the iris 18b as the velocity of the preselected fluid entering the intake port 13 increases. A typical embodiment of a cylindrical chamber 10a determined from the disclosed equation is:

Length—2.0 feet
Inside diameter—0.4 foot
Area of intake port—0.2 sq. ft.
Area of lighter exhaust passage 14—0.16 sq. ft.
Area of heavier exhaust passage 16—0.04 sq. ft.
Circular body (radius)—0.13 foot FIG. 5 shows another alternate embodiment useful in separating the exhaust from an internal combustion engine into atmospheric polluting and nonpolluting effluents. An inlet conduit 12a is connected at a port 13 (not shown) to a cylindrical chamber 10a at one end to an exhaust manifold 30 of an internal combustion engine (not shown) at the other end. The products of combustion of the internal combustion engine are discharged into the first cylindrical chamber 10a. The cylindrical chamber 10a has a lighter exhaust passage 14a and a heavier exhaust passage 16a, as in FIG. 1. Properly dimensioned, the cylindrical chamber 10a separates the lighter density components, methane, ethane, propane, carbon dioxide ($CO_2$) and nitrogen dioxide ($NO_2$) from the internal combustion engine exhaust and emits these through the lighter exhaust passage 14a. The heavier density fluid from butane to tetraethyl lead, exit through the heavier exhaust passage 16a connected to a conduit 32 having a unidirectional valve 34 or check valve therein.

A unidirectional valve is a known way of preventing backward flow in a conduit. In the present application it is used to prevent aspiration by the cylindrical chamber 10a from the exhaust port 16a when the engine is started.

An afterburning chamber 36 having an air inlet 38 is in communication through a heavy density inlet 40 with conduit 32 connected thereto. Conduit 32 can also be in communication with the intake manifold of the engine (not shown) for reignition of the partially combusted fuel in the engine.

An afterburning chamber 36 is a well known apparatus into which combusted fuel and oxygen are combined for reignition. The oxygen can be air or other oxygen containing gas preferably added in at least stoichiometric amounts.

The effluent stream leaving the heavier exhaust passage 16a enters conduit 32 where it is directed into the afterburning chamber 36, at a higher temperature than the internal combustion engine exhaust entering through the inlet conduit 12a (by virtue of the energy-separation characteristic of the Ranque-Hilsch vortex tube itself) and burns without additional heat.

The effluent stream comprising the lighter density fluid can be exhausted to the atmosphere (FIG. 1) or as shown in FIG. 5 where it is also desired to burn the lower density components, i.e., methane, ethane and propane (which are reputed by some to also be responsible for pollution of the air) to add a second cylindrical chamber 10b, in cascade to cylindrical chamber 10a. In this embodiment inlet conduit 12b is connected to lighter exhaust passage 14a. The cylindrical chamber 10b, except for dimensions to accommodate the different densities, is similar to cylindrical chamber 10a. The lighter exhaust passage 14a is connected to the inlet conduit 12b and the lighter density fluid is exhausted therethrough from cylindrical chamber 10a into the second cylindrical chamber 10b.

The circular body 18 (not shown in FIG. 5) can be designed from the presently disclosed equation to separate the fluid components, for example, into a lighter density fluid comprising methane, ethane and propane and a heavier density fluid comprising $CO_2$ and $NO_2$. The methane, ethane and propane then exit through the lighter exhaust passage 14b. An interconnecting conduit 42 having a unidirectional valve 34a or check valve therein (only center line shown) is connected to the lighter exhaust passage 14b at one end and to the intake manifold of the engine (not shown) or to the afterburning chamber 36 at lighter density inlet 44 (or directly into conduit 32). The unidirectional valve 34a prevents aspiration by cylindrical chamber 10b from the afterburning chamber 36 when the engine is started. The methane, ethane, and propane leaving the lighter exhaust passage 14b are carried to, for example, afterburning chamber 36 and burned with the higher temperature, heavier density fluid from the cylindrical chamber 10a.

The heavier density fluid of the effluent stream from cylindrical chamber 10b, containing $CO_2$ and $NO_2$, is then exhausted to the atmosphere from the heavier exhaust passage 16b.

A further alternate embodiment is shown in FIG. 6 where four cylindrical chambers 10c, 10d, 10e and 10f are connected in cascade and enclosed in an outer shell 46. The cylindrical chambers 10c, 10d, 10e and 10f are all similar to the cylindrical chamber 10 described in FIG. 1, having inlet conduits 12c, 12d, 12e and 12f, respectively, connected to intake ports 13 (not shown), lighter exhaust passages 14c, 14d, 14e and 14f, respectively, and heavier exhaust passages 16c, 16d, 16e and 16f, respectively. The inlet conduit 12c which is connected to the intake port 13 (not shown) of the first-in-line cylindrical chamber 10c, pierces the outer shell 46 (attached thereto for support) and connects to a flange 48 adapted for connection to a source of incoming fluid.

Selected fluid received at flange 48 is carried into the cylindrical chamber 10c through inlet conduit 12c. The fluid in the cylindrical chamber 10c is divided into a heavier density fluid and a lighter density fluid which are discharged through the heavier exhaust passage 16c and the lighter exhaust passage 14c, respectively. The heavier exhaust passage 16c is connected to a first mixing conduit 50 having a mixing flange 52 thereon which is adapted for a desired connection thereto.

The lighter exhaust passage 14c is connected to inlet conduit 12d which at the other end connects to the next-in-line cylindrical chamber 10d through intake port 13 (not shown).

The fluid in the cylindrical chamber 10d is divided into a heavier density fluid and lighter density fluid which are discharged through the heavier exhaust passage 16d and the lighter exhaust passage 14d, respectively.

The heavier exhaust passage 16d is connected to the cylindrical chamber 10d at one end and pierces the outer shell 46 before connecting to a flange 54 at the other end which is adaptable for a desired connection.

The lighter exhaust passage 14d is connected to cylindrical chamber 10d at one end and to inlet conduit 12e at the other end. Inlet conduit 12e is in turn connected at intake port 13 (not shown) to cylindrical chamber 10e.

The fluid in the cylindrical chamber 10e is divided into a heavier density fluid and a lighter density fluid which are discharged through the heavier exhaust passage 16e and the lighter exhaust passage 14e, respectively.

The heavier exhaust passage 16e is connected to the cylindrical chamber 10e at one end and pierces the outer shell 46 before connecting to a flange 56 at the other end, which is adaptable for a desired connection.

The lighter exhaust passage 14e is connected to cylindrical chamber 10e at one end and to inlet conduit 12f at the other end. Inlet conduit 12f is connected at intake port 13 (not shown) to cylindrical chamber 10f which is the last-in-line or final stage in the illustrated cascade connection.

The fluid in the last-in-line cylindrical chamber 10f is divided into a heavier density fluid and a lighter density fluid which are discharged through the heavier exhaust passage 16f and the lighter exhaust passage 14f, respectively.

The heavier exhaust passage 16f is connected to the cylindrical chamber 10f at one end and to mixing conduit 50 at the other end.

The lighter exhaust passage 14f is connected to cylindrical chamber 10f at one end and pierces the outer shell 46 before connecting to a flange 58 at the other end for a desired connection.

The mixing conduit 50 illustrates how the exhaust stream from the heavier exhaust passages 16c and 16f can be mixed. The effluent streams leaving the heavier exhaust passages 16c and 16f may be separately removed if so desired.

FIG. 6 has been shown and described as an example of an apparatus which can have as many cylindrical chambers 10 as desired, for example $n$, to divide the incoming stream having at least $n+1$ different density components therein, into any number of effluent streams of selected component densities therein and is not meant to limit the present invention.

Many different embodiments of this invention may be made without departing from the scope and spirit thereof. Therefore, it is to be understood that the invention is not to be limited to the specific embodiments shown and described therein, except as defined in the appended claims.

I claim:

1. A chamber for separating a preselected stream of fluid having at least two different density components, into at least a lighter density effluent and a heavier density effluent, which comprises:
   (a) a substantially cylindrical chamber enclosed at its far end and necked down at its near end to form an axially aligned lighter exhaust passage for said lighter density effluent, said cylindrical chamber having an intake port intersecting said periphery adjacent said near end and a heavier exhaust passage for said heavier density effluent intersecting said periphery adjacent said far end;
   (b) an entrance conduit communicating with said intake port, the axis thereof having a direction component tangent to said periphery at said intake port; and
   (c) a circular body having a radius which is smaller than said cylindrical chamber radius and affixed coaxially therewith upstream and adjacent said heavier exhaust passage.

2. A chamber for separating a preselected stream of fluid having a plurality of different density components, into at least a lighter density effluent and a heavier density effluent, the lightest density component in said heavier density effluent to be a preselected density component which is related to the radius of said circular body by the equation:

$$\rho r = \rho r_w \left[ 1 + \frac{\omega^2 r_w^2}{2C_p g T_w} \left( \frac{r^2}{r_w^2} - 1 \right) \right]^{1/\alpha - 1}$$

where:

$\rho r$ = the fluid density of said preselected density component, $\rho r_w$ = the fluid density of the heaviest density component in said preselected stream of fluid, $\omega$ = the angular velocity of fluid in said far end of said cylindrical chamber, $r_w$ = the inside radius of said cylindrical chamber, $C_p$ = the specific heat at constant pressure of said preselected stream of fluid, $g$ = the acceleration due to gravity, $T_w$ = the temperature of the fluid adjacent the inside wall of said cylindrical chamber near the heavier exhaust passage, $r$ = the radius of said circular body, and $\alpha$ = the ratio of the specific heat at constant pressure to the specific heat at constant volume of said preselected stream of fluid which comprises:
   (a) a substantially cylindrical chamber enclosed at its far end and necked down at its near end to form an axially aligned lighter exhaust passage for said lighter density effluent, said cylindrical chamber having an intake port intersecting said periphery adjacent said near end and a heavier exhaust passage for said heavier density effluent intersecting said periphery adjacent said far end;
   (b) an entrance conduit communicating with said intake port, the axis thereof having a direction component tangent to said periphery at said intake port; and
   (c) a circular body having a radius which is smaller than said cylindrical chamber radius and affixed coaxially therewith upstream and adjacent said heavier exhaust passage.

3. A chamber as described in claim 1, in which said circular body is a cone with a base radius equal to $r$ and said base is affixed to at least one stud projecting from the far end of said cylindrical chamber.

4. A chamber as described in claim 3, in which said cone is a right circular cone.

5. A chamber as described in claim 2, in which means are provided for varying said radius of said circular body relative to the flow rate of said preselected stream of fluid in said entrance conduit whereby said radius of said circular body is increased as said flow rate is increased.

6. A chamber as described in claim 5, in which the means provided for varying said radius of said circular body include an iris whose radius is varied by linkage from a flow metering servomechanism responsive to said flow rate of said preselected stream of fluid.

7. A chamber as described in claim 5, in which the means provided for varying said radius of said circular body include a butterfly valve actuated by linkage from a flow metering servomechanism responsive to said flow rate of said preselected stream of fluid, so that said butterfly valve is partially closed at low flow rates and fully closed at high flow rates.

8. In combination with an internal combustion engine having an exhaust conduit for expelling engine exhaust therefrom, a chamber for separating said engine exhaust into at least a lighter density effluent and a heavier density effluent, which comprises:

(a) a substantially cylindrical chamber enclosed at its far end and necked down at its near end to form an axially aligned lighter exhaust passage for said lighter density effluent, said cylindrical chamber having an intake port intersecting said periphery adjacent said near end and a heavier exhaust passage for said heavier density effluent intersecting said periphery adjacent said far end;

(b) an entrance conduit communicating with said intake port, the axis thereof having a direction component tangent to said periphery at said intake port, the opposite end of said entrance conduit communicating with said exhaust conduit; and (c) a circular body having a radius which is smaller than said cylindrical chamber radius and affixed coaxially therewith upstream and adjacent said heavier exhaust passage.

9. A chamber as described in claim 8, in which said engine exhaust is to be separated with a preselected density component as the lightest density component in said heavier density effluent wherein said preselected density component is related to the radius of said circular body by the equation:

$$\rho r = \rho r_w \left[ 1 + \frac{\omega^2 r_w^2}{2 C_p g T_w} \left( \frac{r^2}{r_w^2} - 1 \right) \right]^{1/\alpha - 1}$$

where:

$\rho r$ = the fluid density of said preselected density component, $\rho r_w$ = the fluid density of the heaviest density component in said engine exhaust, $\omega$ = the angular velocity of fluid in said far end of said cylindrical chamber, $r_w$ = the inside radius of said cylindrical chamber, $C_p$ = the specific heat at constant pressure of said engine exhaust, $g$ = the acceleration due to gravity, $T_w$ = the temperature of the fluid adjacent the inside wall of said cylindrical chamber near the heavier exhaust passage, $r$ = the radius of said circular body; and $\alpha$ = the ratio of the specific heat at constant pressure to the specific heat at constant volume of said engine exhaust.

10. A chamber as described in claim 9, in which said circular body is a cone with a base radius equal to $r$ and said base is affixed to at least one stud projecting from the far end of said cylindrical chamber.

11. A chamber as described in claim 10, in which said cone is a right circular cone.

12. A chamber as described in claim 9, in which means are provided for varying said radius of said circular body relative to the flow rate of said engine exhaust in said entrance conduit whereby said radius of said circular body is increased as said flow rate is increased.

13. A chamber as described in claim 12, in which the means provided for varying said radius of said circular body include an iris whose radius is varied by linkage from a flow metering servomechanism responsive to said flow rate of said engine exhaust.

14. A chamber as described in claim 12, in which the means provided for varying said radius of said circular body include a butterfly valve actuated by linkage from a flow metering servomechanism responsive to said flow rate of said engine exhaust.

15. A chamber as described in claim 9, in which means are provided for varying said radius of said circular body relative to the position of the throttle linkage of said internal combustion engine whereby said radius of said circular body is increased as said throttle linkage increases the amount of fuel metered to said internal combustion engine.

16. A chamber as described in claim 15, in which the means provided for varying said radius of said circular body includes an iris whose radius is varied by linkage connected to said throttle linkage of said internal combustion engine and responsive thereto.

17. A chamber as described in claim 15, in which the means provided for varying said radius of said circular body include a butterfly valve actuated by linkage connected to said throttle linkage of said internal combustion engine and responsive thereto.

18. A chamber as described in claim 8, in which the components included in said lighter density effluent include methane, ethane, propane, carbon-dioxide and nitrogen-dioxide.

19. A chamber as described in claim 2, in which at least two said chambers are connected in cascade through an interconnecting conduit connected to said lighter exhaust passage of said first cylindrical chamber at one end and to said intake port of said second cylindrical chamber at the other end, whereby at least three effluents are obtained, each having a different predetermined density component therein.

20. A chamber as described in claim 19, in which said intake port of said first cylindrical chamber is associated in working relationship with the exhaust manifold of an internal combustion engine.

21. A chamber as described in claim 20, in which said lighter density effluent from said first cylindrical chamber include methane, ethane, propane, carbon-dioxide and nitrogen-dioxide and said heavier density effluent from said second cylindrical chamber include carbon-dioxide and nitrogen-dioxide, which are released to the atmosphere.

22. A chamber as described in claim 21, in which said heavier exhaust passage of said first cylindrical chamber and said lighter exhaust passage of said second cylindrical chamber are connected to an afterburning chamber into which air is introduced in at least stoichiometric amounts to support combustion of the components flowing therein.

23. A chamber as described in claim 22, in which said afterburning chamber is the intake manifold of said internal combustion engine, whereby the components can be reignited in the combustion chamber of said internal combustion engine.

24. A cascade chamber for separating a preselected stream of fluid having at least $n+1$ different density components, into a maximum of $n+1$ density separated effluent streams, which comprises:

(a) $n$ substantially cylindrical chambers, each enclosed at its far end and necked down at its near end to form axially aligned lighter exhaust passages for a lighter density effluent each cylindrical chamber having an intake port intersecting said periphery adjacent said near end and a heavier exhaust passage in each cylindrical chamber for a heavier density effluent at the far end of said periphery of each cylindrical chamber whereby at least a portion of said preselected stream entering said intake port of each said cylindrical chamber is separated into a lighter density effluent and a heavier density effluent;

(b) $n$ entrance conduits, each communicating with a separate intake port, the axis thereof having a direction component tangent to said periphery at said intake port associated therewith;

(c) $n$ circular bodies, one for each of said cylindrical chambers, each having a radius which is smaller than said cylindrical chamber radius with which it is associated, and each affixed coaxially therewith upstream and adjacent said heavier exhaust passage:

(d) $n-1$ connecting conduits each connected to a different one of said lighter exhaust passages at one end and to a different one of said entrance conduits to form a cascade relationship from said lighter exhaust passage of a first-in-line cascade connected cylindrical chamber through to said entrance of a last-in-line cascade connected cylindrical chamber;

(e) $n$ heavier exhaust conduits each connected to a separate heavier exhaust passage whereby said heavier density effluent from each separation in each said cylindrical chamber is separately removed as desired; and (f) an outer shell enclosing all of said cylindrical chambers therein and fixedly attached to said first-in-line entrance conduit and all said heavier exhaust passages extending therethrough from said cylindrical chambers.

25. A cascade chamber as described in claim 24, in which there are 4 cylindrical chambers.

26. A cascade chamber as described in claim 25, in which at least two of said heavier exhaust conduits are connected in parallel.

References Cited
UNITED STATES PATENTS

| | | | |
|---|---|---|---|
| 3,129,075 | 4/1964 | Anliot | 62—5 |
| 2,650,582 | 9/1953 | Green | 62—5 |
| 2,758,914 | 8/1956 | King | 62—5 |
| 2,839,900 | 6/1958 | Green | 62—5 |
| 2,870,611 | 1/1959 | Hendal | 62—5 |
| 2,907,174 | 10/1959 | Hendal | 62—5 |
| 3,116,344 | 12/1963 | Deisler | 62—5 |
| 3,203,190 | 8/1965 | Jentet | 62—5 |

WILLIAM J. WYE, Primary Examiner